United States Patent [19]

Pampouchidis

[11] 4,147,676

[45] Apr. 3, 1979

[54] CATHODICALLY DEPOSITABLE COATING COMPOSITIONS AND METHOD OF PREPARING

[75] Inventor: Georgios Pampouchidis, Graz, Austria

[73] Assignee: Vianova Kunstharz, A.G., Vienna, Austria

[21] Appl. No.: 849,265

[22] Filed: Nov. 7, 1977

[30] Foreign Application Priority Data

Nov. 8, 1976 [AT] Austria .................. 8278/76

[51] Int. Cl.$^2$ .................. C09D 3/72; C09D 5/02; C09D 5/40

[52] U.S. Cl. .................. 260/23 TN; 204/14 R; 204/181 C; 260/18 TN; 260/29.2 TN; 528/44; 528/45; 528/53; 528/75

[58] Field of Search .................. 260/77.5 TB, 23 TN, 260/29.2 TN, 18 TN; 204/181 C; 528/44, 45, 53, 75

[56] References Cited

U.S. PATENT DOCUMENTS

| | | | |
|---|---|---|---|
| 3,499,824 | 3/1970 | Strazdins et al. | 260/29.2 TN |
| 3,799,854 | 3/1974 | Jerabek | 260/29.2 TN |
| 3,804,786 | 4/1974 | Sekmakas | 260/29.2 TN |
| 3,883,483 | 5/1975 | Anderson et al. | 260/77.5 TB |
| 3,891,602 | 6/1975 | Hughes | 260/77.5 TB |
| 3,922,253 | 11/1975 | Jerabek et al. | 260/29.2 TN |
| 3,947,339 | 3/1976 | Jerabek et al. | 260/29.2 TN |
| 3,992,345 | 11/1976 | Dumas | 260/29.2 TN |
| 4,016,120 | 4/1977 | Matsuda et al. | 260/29.2 TN |
| 4,031,050 | 6/1977 | Jerabek | 260/77.5 TB |
| 4,036,795 | 7/1977 | Tominaga | 260/29.2 TN |
| 4,036,800 | 7/1977 | Sekmakas et al. | 260/29.2 TN |

*Primary Examiner*—Ronald W. Griffin
*Attorney, Agent, or Firm*—A. W. Breiner

[57] ABSTRACT

Heat curable binders for use in cathodically depositable aqueous coating compositions characterized in that curing is through alpha, beta-double bonds on end or side chains of the binders are described. The binders are the reaction product of 2 moles of a diepoxide; 1 mole of a secondary-secondary or primary-tertiary diamine; 2 moles of monocarboxylic acid, and an alpha, beta-unsaturated monoisocyanate, and have an alpha, beta-functionality of from about 0.8 to 2.5. The binders are rendered water soluble by neutralization with inorganic and/or organic acids. Coating compositions comprising such binders cure at low temperatures and short curing times to provide films having excellent resistance to water, chemicals, and corrosion.

19 Claims, No Drawings

CATHODICALLY DEPOSITABLE COATING COMPOSITIONS AND METHOD OF PREPARING

The present invention is directed to the preparation of, and coating compositions which are water-dilutable upon neutralization with acids. The coating compositions are electrically depositable at the cathode of an electrodeposition system and will crosslink through thermal polymerization without need of additional components.

Electrodeposition of synthetic resins and plastics has been known for quite some time but has gained technical importance as a coating process in recent years only. The coating compositions or binders primarily used for electrodeposition contain polycarboxylic acid resins neutralized with bases. The products deposit at the anode of an electrodeposition system. Owing to the acidic character of the resins, they are sensitive to corroding influences exerted by salts and particularly by alkalis. Furthermore, coatings of the aforesaid compositions tend to undergo spot discoloration or undergo other chemical changes as a result of the metal ions anodically dissolved from the anode.

There are a great number of binders disclosed in the literature carrying groupings neutralizable with acids which can be deposited on cathodically wired objects of an electrodeposition system. However, all have shortcomings, or have disadvantages in use. The most serious problem with acid neutralizable coating compositions is the inability to use the crosslinking aids normally used with anodic deposition represented by a more or less acidic film at the anode or the oxygen originating at the anode. The known coating compositions cathodically depositable through the introduction of amine groups in the resins require, therefore, the addition of acid catalysts enabling the reaction with the crosslinking constituent, i.e., amine or phenolic resins. The acid catalysts adversely influence bath stability, application characteristics, and film properties.

DT-OS No. 21 31 060 discloses coating compositions which comprise polyamine resins and masked isocyanates as a two-component system. The aforesaid systems give rise to problems of bath stability; and, furthermore, the masked isocyanates require high curing temperatures and long curing times. Moreover, the blocking agents of the isocyanates have to evaporate on stoving, leading to soiling of the stoving lines and to pollution of the air. Residues of the blocking agents in the film have an adverse influence on the film properties.

DT-OS No. 22 52 536 discloses the preparation of cathodically depositable coating compositions comprising combinations of epoxy-resin-amine adducts and isocyanate containing products of diisocyanates and alcohols. Again, high curing temperatures and long curing times are necessary for satisfactory film formation. A further disadvantage is pollution resulting from the urethane decomposition products. Residues of the inert components adversely affect the performance of the coating.

U.S. Pat. No. 3,883,483 discloses urethane reaction products for use as cathodic binders. The products are obtained from alcohols, diisocyanates, and hydroxyalkylacrylates which serve as copolymerizable monomers in the production of copolymers. Film formation is effected through urethane splitting and, accordingly, the disadvantages noted with respect to the coatings of DT-OS No. 21 31 060 and DT-OS No. 22 52 536 are again encountered.

It has now been found that coating compositions for cathodically depositable electrodeposition paints which are thermosetting without addition of crosslinking components and, thus, do not have the disadvantages of the prior art coating compositions, can be produced by reacting a diepoxy compound with specially selected diamines and select polymerizable compounds followed by rendering of the reaction products water soluble through neutralization with acids.

More specifically, the coating compositions of the present invention which are self-crosslinking binders for cathodically depositable electro-deposition paints are characterized in that (A) 2 moles of a diepoxy compound with an epoxy equivalent of at least 100, (B) 1 mole of an aliphatic and/or cycloaliphatic and/or aromatic diamine, the nitrogen atoms of the diamine being either secondary-secondary or primary-tertiary nitrogen atoms, and (C) 2 moles of a saturated and/or unsaturated monocarboxylic acid are reacted, and the hydroxy groups of the reaction product are subsequently reacted partially or completely with (D) an alpha,beta-unsaturated monoisocyanate.

The obtained product is rendered water soluble through partial or total neutralization with inorganic and/or organic acids. In the preparation of the coating composition, the quantity of unsaturated monocarboxylic acid (C) and the unsaturated monoisocyanate (D) is chosen in order that the unneutralized final product has a double bond functionality of at least 0.5, and preferably from about 0.8 to about 2.5, calculated on the alpha,beta-double bond linkages. Double bond functionality or number as used herein is the number of double bond linkages per 1000 molecular weight units. The binders of the invention are self-crosslinking and mainly cure through thermic polymerization of the alpha,beta-unsaturated double bonds. The obtained films exhibit outstanding resistance to chemicals, water, alkali, and corrosion.

In addition to the outstanding properties of the films of coatings obtained with the coating compositions of this invention, the present invention provides a number of other advantages. By judicious selection of the diepoxy compounds and the diamine the performance of the resulting coatings can be influenced substantially and, furthermore, the basicity of the system can be adjusted in order that upon partial neutralization, i.e., at a pH-value of from 6 to 8, dilution with water and electrodeposition are possible. The problems of bath stability and possible corrosion of deposition and stoving equipment through the neutralizing acids can be substantially eliminated. Another special advantage of the coating compositions of the invention is that they do not require hardening components and/or acid catalysts for curing, thus avoiding the disadvantages and troubles normally encountered with such components. An additional advantage is that through type and quantity of the unsaturated monocarboxylic acid selected, as well as the polymerizable isocyanate containing intermediate, the properties and particularly the crosslinking density of the coatings can be varied within wide limits. Accordingly, the flexibility of the films may be tailored to meet the requirements of the end use.

A still further advantage of the present invention is the possibility of adjusting flow and leveling to an optimum, i.e., the formation of a faultless or flawless film surface on stoving of the electrodeposited film. In general, leveling is a problem closely related to the deposition procedure at the cathode. As is known, on deposition relatively large quantities of hydrogen gas are set free rendering the wet deposited film rather porous. Thus, the binder has to cure well on stoving; however, it should form a smooth coherent film. Thus, as is apparent, two divergent processes are involved. Furthermore, leveling is adversely influenced by the relatively low film thickness (max. 25 μm). According to the present invention these difficulties are overcome since it permits introducing additional plasticizing and other additional components to the starting materials to enhance leveling.

A further and essential advantage is that the binders of the present invention carry chain end or side chain alpha,beta-double bonds exclusively. Thus, curing through thermic polymerization at relatively low temperatures and with short curing times is possible. Moreover, it is of great significance that curing of the coating compositions of the invention is effected through thermic polymerization of the —C=C— double bonds. Owing to this —C=C— crosslinking, the obtained coatings afford excellent resistance to water, chemicals, and other corrosive influences as noted hereinbefore.

The preferred diepoxy compounds suitable for the present invention are glycidyl ethers of phenols, particularly derived from 4,4'-bis(hydroxyphenyl)-propane (Bisphenol A). However, glycidyl ethers of phenol formaldehyde condensates of the novolak type can be used as well as the glycidyl esters of aliphatic, aromatic, or cycloaliphatic mono- or polycarboxylic acids, and the glycidyl ethers of aliphatic or cycloaliphatic diols or polyols. A detailed description of this class of materials is given by A. M. Paquin, "Epoxy Compounds And Epoxy Resins," edition Springer 1958. It is only essential that the diepoxy component is film forming, compatible, and reactive with the diamine and monocarboxylic acid selected; and, accordingly, the aliphatic, aromatic, and cycloaliphatic moiety can vary widely with the aforesaid proviso in mind, as will be apparent to one skilled in the art.

The diamines of component (B) are either secondary-secondary or primary-tertiary diamines. Secondary-secondary amines of the general formula

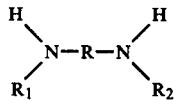

wherein R is an aliphatic, cycloaliphatic, or aromatic radical; and $R_1$ and $R_2$ are alkyl or alkanol radicals such as N,N'-diethylpropylene diamine; N,N'-diethanol propylene diamine; N,N'-diethyl isophorone diamine; N,N'-diethanolisophorone diamine can be selected. Suitable primary-tertiary diamines with the general formula

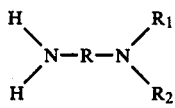

wherein R, $R_1$ and $R_2$ having the same significance as above are, for example, 3-dimethylaminopropyl amine; 3-diethylaminopropylamine; 4-dimethylaminobutylamine; 4-diethylaminobutylamine; 3-diethanolaminopropylamine; N,N'-dimethylisophoronediamine; N-(2-aminoethyl)-morpholine; N-(3-aminopropyl)-morpholine, and N,N'-diethylisophoronediamine. It is only essential that the diamine is compatible and reactive with the diepoxy and monocarboxylic acid selected; and, accordingly, the aliphatic, aromatic, cycloaliphatic, alkyl, and alkanol moieties can vary widely with the aforesaid proviso in mind, as will be apparent to one skilled in the art.

Suitable unsaturated monocarboxylic acids (component (C)) are alpha,beta-unsaturated acids such as acrylic, methacrylic, or crotonic acid; semi-esters of maleic acid and itaconic acid with saturated monoalcohols or semi-esters of other aliphatic, cycloaliphatic, or aromatic dicarboxylic acids with alpha,beta-ethylenically unsaturated monoalcohols, for example semi-esters obtained through reaction of succinic anhydride, phthalic anhydride, tetra- or hexahydrophthalic anhydride with hydroxy-alkyl-acrylates or -methacrylates, or esters of acrylic acid with di-, tri-, or polyalkylene glycols. Other suitable unsaturated or saturated monocarboxylic acids are acids with 2 to 18 C-atoms, e.g., acetic acid, n-capronic acid, isononanoic acid, palmitic acid, dehydrated castor oil fatty acid, oleic acid, stearic acid, used in place of or used in conjuction with alpha, beta-unsaturated carboxylic acids. In the event of partial or total use of unsaturated monocarboxylic acids carrying no alpha,beta-double bonds, as well as with the use of saturated monocarboxylic acids, the alpha,beta-double bonds essential for crosslinking are introduced in the subsequent process step by reaction with the unsaturated monoisocyanate. The unsaturated monoisocyanate is used in any case where an increase in crosslinking density is desired. It is only essential that the unsaturated or saturated monocarboxylic acid is compatible and reactive with the diepoxide-diamine reaction product, or is compatible and reactive with the diepoxide and diamine when the two are in admixture. Accordingly, the moieties of the acid including the aliphatic, aromatic, and cycloaliphatic moieties can vary substantially with the aforesaid proviso in mind, as will be apparent to one skilled in the art.

The preferred monoisocyanates are the reaction products of aromatic, aliphatic, or cycloaliphatic di- or polyisocyanates or mixtures of such compounds with ethylenically unsaturated monomers carrying at least one hydrogen atom reactive with isocyanates and the group

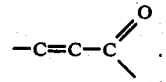

The reaction between the isocyanate and the monomer is carried out in known manner at 20° to 80° C., preferably at 30° to 60° C. The weight ratios between the two reaction partners are chosen such that the isocyanate reaction product contains an average of one free isocyanate group. Suitable di- or polyisocyanates are: aromatic polyisocyanates such as 2,4- or 2,6-toluylenediisocyanate; 4,4'-diphenylmethane diisocyanate; diphenylmethylmethane-4,4'-diisocyanate; naphthylene-1,5-diisocyanate; triphenylmethane-4,4',4"-triisocyanate or cycloaliphatic isocyanates such as isophoronediisocyanate, cyclohexane-1,4-diisocyanate and aliphatic isocyanates such as trimethyl-hexamethylene-1,6-diisocyanate; trishexamethylenetriisocyanate. The alpha,beta-unsaturated monomers suitable for the reaction with polyisocyanates are preferably hydroxyalkyl esters of acrylic or methacrylic acid, the alkyl radical carrying 2 to 10 C-atoms, such as hydroxy ethyl acrylate; hydroxyethylmethacrylate; 2-hydroxypropylacrylate; 2-hydroxypropylmethacrylate; 4-hydroxybutylacrylate; 4-hydroxybutylmethacrylate; tripropyleneglycolmonoacrylate, and tripropyleneglycolmonomethacrylate. Furthermore, carboxy groups containing unsaturated compounds can be reacted with the polyisocyanates, $CO_2$ being set free, for example acrylic acid or methacrylic acid, maleic acid semi-esters from maleic anhydride and monoalcohols of 1 to 6 C-atoms. Another suitable group of monomers comprises amide groups carrying alpha,beta-unsaturated compounds, as long as they still carry an active hydrogen atom, for example (meth)acrylamide and the corresponding derivatives. Accordingly, it is only essential that the unsaturated monoisocyanate is compatible and reactive with the reaction product of the diepoxide, diamine, and monocarboxylic acid. Further, it is essential that the monoisocyanate provide together with the monocarboxylic acid sufficient alpha,beta-double bonds to provide the necessary alpha,-beta-double bond functionality or number. Accordingly, the aliphatic, aromatic, and cycloaliphatic moieties can vary substantially with the aforesaid proviso in mind, as will be apparent to one skilled in the art.

The type and quantity of diepoxy compound, diamine, and saturated or unsaturated monocarboxylic acid and unsaturated monoisocyanate are chosen that upon addition the macromolecule, on the one hand, carries sufficient basic nitrogen atoms in order to give a water-soluble end product upon neutralization; and, on the other hand, it carries a sufficient number of polymerizable double bonds to satisfactorily crosslink on curing.

The process for the preparation of the coating compositions of the invention will vary depending upon the reactants selected. In the event alpha,beta-unsaturated monocarboxylic acids are selected the reaction is preferably carried out by first reacting diepoxide at from about 100° to 170° C. with the diamine and then reacting the diepoxide-diamine reaction product at from about 100° to 130° C. with the alpha,beta-unsaturated monocarboxylic acid. Polymerization inhibitors can be used. If monocarboxylic acids are used which carry no alpha,beta-unsaturated double bonds, all the reactants may be charged simultaneously and the reaction temperature maintained at about 170° C. to reduce reaction time. Thereafter, the intermediate reaction product is further reacted with the necessary quantity of an unsaturated monoisocyanate at a temperature of from about 20° to 80° C. and preferably from about 40° to 70° C. until an NCO-value of 0 is obtained. The reaction can be carried out in the presence of an inert solvent.

A further plastification of the films, in order to further enhance leveling on stoving or for increasing the flexibility of the films, can be effected through the introduction of plasticizing groups by reaction with specific monoisocyanates. The specific plasticizing monoisocyanate component is obtained through reaction at from 20° to 80° C., preferably 30° to 60° C., of aromatic, aliphatic, or cycloaliphatic di- or polyisocyanates or blends of such compounds with longer chain unsaturated monoalcohols such as 10-undecene-1-ol; 9 c-octadecene-1-ol (oleyl alcohol); 9 t-octadecene-1-ol (elaidyl alcohol); 9 c, 12 c-octadecadiene-1-ol (linoleyl alcohol); 9 c, 12 c, 15 c-octadecatriene-1-ol (linolenyl alcohol); 9 c-eicosene-1-ol (gadoleyl alcohol); 13 c-docosene-1-ol (eruca alcohol); and 13 t-docosene-1-ol (brassidyl alcohol). Saturated monoalcohols with at least 6 C-atoms can be coemployed with the unsaturated alcohol at a suitable level to enhance flow characteristics. Such monoalcohols include hexanol, nonanol, decanol, and their homologues such as dodecanol (lauryl alcohol), octadecanol (stearyl alcohol), as well as alkyl alcohols such as 2-ethylhexanol, 2-pentylnonanol, 2-decyltetradecanol, and other alcohols known as the Guerbet-alcohols. The same di- or polyisocyanates are suitable which are used for preparing the unsaturated monoisocyanates as above illustrated. However, when using different monoisocyanates, the reaction may be carried out simultaneously or in separate reactions steps. In a further modification of the process, the modifying isocyanate components may be introduced in the form of a joint reaction product, e.g., of 1 mole of diisocyanate, 0.4 to 0.9 moles of a hydroxyacrylate and/or -methacrylate, and 0.1 to 0.6 moles of a monoalcohol suitable for the process. The quantities of the reaction partners are chosen in order that with 1 mole of diisocyanate, 1 mole of the blend of hydroxy(meth)acrylate and monoalcohol are reacted.

The amino groups of the coating compositions of the invention are partially or totally neutralized with organic and/or inorganic acids, e.g., formic acid, acetic acid, lactic acid, phosphoric acid, etc., and are then diluted with water. The degree of neutralization depends upon the characteristics of the individual binder. The preferred binder composition allows dilution or dispersion with water at a pH-value of from about 4 to 9 and preferably from about 6 to 8. The concentration in water of the binder depends upon the parameters of electrodeposition and may lie in a range of from about 3 to 30 percent by weight, preferably of from about 5 to 15 percent by weight. The applied coating composition may optionally contain various additives including pigments, extenders, and surface active agents.

Upon electrodeposition the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc., but also of other metalized materials or materials rendered conductive through a conductive coating. After deposition the coating is cured at a stoving schedule of from about 130° to 200° C., preferably from about 150° to 180° C., for about 5 to 30 minutes, preferably from about 10 to 25 minutes.

The following examples illustrate the invention without limiting its scope:

Preparation Of The Monoisocyanates A Through H 1 mole of diisocyanate is charged to the reaction vessel and while preventing access of moisture and with stirring, 1 mole of the isocyanate reactive component is added within 1 hour at 25° to 35° C. Then the batch is slowly heated to 70° C. and held for 1 hour at 70° C.

| Diisocyanate | | Isocyanate reactive compounds | |
|---|---|---|---|
| A | toluylenediiso- (174g) | hydroxyethylmethacrylate | (130g) |

-continued

| | Diisocyanate | | Isocyanate reactive compounds | |
|---|---|---|---|---|
| B | toluylenediiso-cyanate | (174g) | hydroxypropylacrylate | v(130g) |
| C | toluylenediiso-cyanate | (174g) | hydroxybutyllacrylate | (144g) |
| D | toluylenediiso-cyanate | (174g) | nonanol | (144g) |
| E | toluylenediiso-cyanate | (174g) | hydroxyethylmethacrylate oleyalcohol | (91g) (80.5g) |
| F | toluylenediiso-cyanate | (174g) | tetrapropyleneglycol-momomethacrylate (techn.) | (350g) |
| G | isophoronediiso-cyanate | (222g) | hydroxyethylacrylate | (116g) |
| H | hexamethylene-diisocyanate | (168g) | hydroxyethylmethacrylate | (130g) |

The reaction products each contain 1 equivalent of (a) free isocyanate groups and (b) polymerizable double bond.

EXAMPLES 1-20

The designated diamine is added to the designated diepoxide in a reaction vessel equipped with stirrer, thermometer, and reflux condensor and subsequently completely reacted at 100° to 150° C. An isocyanate inert solvent such as ethylglycol acetate can be employed. Thereafter the reaction product of diepoxide-diamine is reacted at 100° to 170° C. with the monocarboxylic acid. Polymerization inhibitors such as hydroquinone may be used. Thereafter the reaction product is blended with the designated monoisocyanate intermediate and, while preventing access of moisture, is reacted at 50° to 70° C. to an NCO-value of 0.

The reaction with the diepoxy compound and the diamine and a non-alpha,beta-unsaturated monocarboxylic acid can also be effected in one reaction step at 100° to 170° C., without the results being influenced substantially.

The quantities of components and the specific reaction conditions are tabulated in Table 1.

TABLE 1

| B | Diepoxide (2 mol) | Diamine (1 mol) | Reaction Conditions h/° C. | Monocarboxylic Acid (2 mol) | Reaction Conditions h/° C. | Monoisocyanate (mol) | Reaction Conditions h/° C. |
|---|---|---|---|---|---|---|---|
| 1 | EPH A | DMAPA | 3/150 | ACS | 3/120 | — | — |
| 2 | EPH A | DMAPA | 3/150 | ACS | 3/120 | 1 A | 1/50-60 |
| 3 | EPH A | DMAPA | x) | INS | 5/170 | 2 A | 1/60-70 |
| 4 | EPH A | DMAPA | x) | PTS | 5/170 | 2 B | 1/60-70 |
| 5 | EPH A | DMAPA | 3/150 | ACS | 3/120 | 2 F | 1/60-70 |
| 6 | EPH A | DMAPA | 3/150 | ACS | 3/120 | 2 H | 2/60-70 |
| 7 | EPH A | DMAPA | 3/150 | OLS | 3/170 | 2 B | 1/60-70 |
| 8 | EPH A | DMAPA | 3/150 | OLS | 3/170 | 2 G | 2/60-70 |
| 9 | EPH A | DMAPA | 3/150 | ACS | 3/120 | 1 D | 1/60-70 |
| 10 | EPH A | DMAPA | 3/150 | MACS | 3/120 | 1 C | 1/60-70 |
| 11 | EPH A | DAPDA | 3/150 | ACS | 3/120 | 1 A | 1/50-60 |
| 12 | EPH A | DAPDA | 3/150 | ACS | 3/120 | 1 B | 1/50-60 |
| 13 | EPH A | DAPDA | x) | RFS | 3/170 | 2 A | 1/60-70 |
| 14 | EPH B | DMAPA | 3/150 | ACS | 3/120 | 1 B | 1/50-60 |
| 15 | EPH B | DMAPA | x) | INS | 5/170 | 2 A | 1/60-70 |
| 16 | EPH B | DMAPA | x) | RFS | 3/170 | 2 A | 1/60-70 |
| 17 | EPH B | DMAPA | x) | RFS | 3/170 | 2 G | 2/60-70 |
| 18 | EPH A | AAM | 3/150 | ACS | 2/120 | 0.5 A | 1/50-60 |
| 19 | EPH A | AAM | 3/150 | ACS | 3/120 | 1.5 E | 2/50-60 |
| 20 | EPH A | AAM | 3/150 | RFS | 3/170 | 2 A | 2/60-70 | x) The diepoxide is simultaneously reacted with the diamine and the monocarboxylic acid.
Key to abbreviations used in Table 1
EPH A — liquid epoxy resin of Bisphenol A with an epoxy equivalent of about 180
EPH B — highly viscous epoxy resin of Bisphenol A with an epoxy equivalent of about 180
DMAPA — 3-dimethylaminopropylamine
DAPDA — N,N'-diethylpropylenediamine
AAM — N-(2-aminoethyl)-morphdine
ACS — acrylic acid
MACS — methacrylic acid
INS — isononanoic acid
PTS — palmitic acid
OLS — oleic acid
RFS — dehydrated castor oil fatty acids

Evaluation Of The Binders Of Examples 1-20

Referring to Table 2, 100 g, based on resin solids, of the binder of the designated example were mixed with the quantity of, and acid designated and made up to 1000 g with deionized water while stirring. The binders as 10 percent aqueous solutions were deposited on various substrates as the cathode of an electrodeposition system. Deposition time in all cases was 60 seconds. The coated substrates were rinsed with deionized water and cured at the listed temperature. Average film thickness of the cured films was between 13 to 17 μm.

Test results of the evaluation are also listed in Table 2.

TABLE 2

| | Neutralization | | | Deposition | | Test | | | |
|---|---|---|---|---|---|---|---|---|---|
| B | Quantity 1) | Type 2) | pH 3) | Volt | Curing min/° C. | Hardness 4) | Indentation 5) | Resistance 6) | 7) |
| 1 | 3.5 | E | 6.5 | 190 | 15/170 | 180 | 7.9 | 320 | 200 |
| 2 | 3.8 | E | 6.2 | 220 | 20/180 | 190 | 7.1 | 360 | 240 |
| 3 | 3.8 | E | 6.2 | 230 | 25/180 | 175 | 7.7 | 360 | 240 |
| 4 | 4.0 | E | 6.0 | 240 | 25/180 | 160 | 8.4 | 320 | 200 |
| 5 | 3.8 | E | 6.1 | 240 | 20/180 | 150 | 8.5 | 320 | 240 |
| 6 | 3.8 | E | 6.1 | 220 | 20/180 | 160 | 8.1 | 360 | 240 |

TABLE 2-continued

| B | Neutralization Quantity 1) | Type 2) | pH 3) | Deposition Volt | Curing min/° C. | Test Hardness 4) | Indentation 5) | Resistance 6) | 7) |
|---|---|---|---|---|---|---|---|---|---|
| 7 | 4.0 | E | 6.1 | 230 | 25/180 | 175 | 8.6 | 480 | 360 |
| 8 | 4.0 | E | 6.0 | 240 | 25/180 | 185 | 8.0 | 480 | 360 |
| 9 | 3.6 | E | 6.3 | 200 | 20/180 | 170 | 8.3 | 240 | 120 |
| 10 | 3.8 | E | 6.2 | 210 | 15/180 | 180 | 7.9 | 360 | 240 |
| 11 | 4.8 | M | 5.8 | 200 | 20/170 | 175 | 8.9 | 300 | 120 |
| 12 | 4.8 | M | 5.8 | 200 | 20/170 | 165 | 9.0 | 300 | 120 |
| 13 | 5.0 | M | 5.6 | 210 | 20/180 | 160 | 8.5 | 300 | 220 |
| 14 | 4.0 | E | 6.0 | 250 | 15/180 | 190 | 7.5 | 480 | 360 |
| 15 | 4.0 | E | 5.9 | 260 | 20/180 | 170 | 7.9 | 240 | 120 |
| 16 | 4.2 | E | 5.8 | 250 | 20/180 | 165 | 8.5 | 360 | 240 |
| 17 | 4.0 | E | 6.0 | 250 | 25/180 | 170 | 8.0 | 320 | 200 |
| 18 | 4.2 | M | 6.0 | 210 | 15/170 | 170 | 7.5 | 300 | 120 |
| 19 | 4.4 | M | 5.8 | 230 | 20/180 | 165 | 7.9 | 240 | 120 |
| 20 | 4.5 | M | 5.6 | 240 | 25/180 | 160 | 8.2 | 280 | 200 |

Key to Table 2
1) quantity of acid in g added to 100 g of resin solids
2) E: acetic acid, M: lactic acid
3) measured on a 10% aqueous solution
4) König pendulum hardness DIN 53 157 (sec)
5) Erichsen indentation DIN 53 156 (mm)
6) hours of water soak at 40° C. until corrosion or blistering become visible
7) salt spray ASTM-B 117-64: 2 mm of corrosion at the cross incision after the stated hours
B — binder made according to designated example number
For this test degreased non-pretreated steel panels were coated with a pigmented paint consisting of 100 parts by weight of resin solids, 20 parts by weight of aluminum silicate pigment, and 2 parts by weight of carbon black.

In the above illustrative examples the diamine, diepoxide, and monocarboxylic acid as well as the unsaturated monoisocyanate can be varied within the bounds hereinbefore designated with substantially similar results. The essential characteristic of the binders is that there are sufficient alpha,beta-double bonds on end or side chains to provide the necessary curing. These and other modifications being within the ability of one skilled in the art are within the scope of the present invention.

It is claimed:
1. Self-crosslinking cathodically depositable binders comprising the reaction product of
(A) the reaction product of
  (a) 2 moles of a diepoxy compound having an epoxy equivalent of at least 100;
  (b) 1 mole of a member of the group consisting of aliphatic diamines, cycloaliphatic diamines, aromatic diamines, and mixtures thereof, the nitrogen atoms of said diamines being secondary-secondary or primary-tertiary nitrogen atoms; and
  (c) 2 moles of a member of the group consisting of saturated monocarboxylic acids, unsaturated monocarboxylic acids, and mixtures thereof;
and
(B) an alpha,beta-ethylenically unsaturated monoisocyanate; the alpha,beta-double bond functionality of said binder being at least 0.5 and said binder being water soluble upon neutralization with an acid.

2. The binder of claim 1 wherein the alpha,beta-double bond functionality is from about 0.8 to about 2.5.

3. The binder of claim 1 wherein there are at least 0.5 basic nitrogen atoms per 1000 grams of binder solids.

4. The binder of claim 1 wherein there are more than 0.7 basic nitrogen atoms per 1000 grams of binder solids.

5. The binder of claim 1 wherein the alpha,beta-ethylenically unsaturated monoisocyanate is the reaction product of a polyisocyanate and an alpha,beta-ethylenically unsaturated monomer carrying at least one isocyanate reactive hydrogen atom and the group

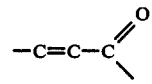

6. The binder of claim 1 including a plasticizing isocyanate.

7. The binder of claim 6 wherein the plasticizing isocyanate is the reaction product of a polyisocyanate and a monoalcohol having at least six carbon atoms.

8. The binder of claim 7 wherein the monoalcohol is unsaturated.

9. The binder of claim 7 wherein the monoalcohol is saturated.

10. Process of producing self-crosslinking cathodically depositable binders comprising reacting
  (a) 2 moles of a diepoxy compound having an epoxy equivalent of at least 100;
  (b) 1 mole of a member of the group consisting of aliphatic diamines, cycloaliphatic diamines, aromatic diamines, and mixtures thereof, the nitrogen atoms of said diamines being secondary-secondary or primary-tertiary nitrogen atoms, and
  (c) 2 moles of the member of the group consisting of saturated monocarboxylic acids, unsaturated monocarboxylic acids, and mixtures thereof;
and subsequently reacting the hydroxyl groups of the reaction product of (a), (b), and (c) with
  (d) an alpha,beta-ethylenically unsaturated monoisocyanate, the quantities of monocarboxylic acid (c) and unsaturated monoisocyanate (d) being selected in order that the reaction product has an alpha,beta-double bond functionality of at least 0.5.

11. The process of claim 10 including the steps of rendering said binder water soluble by neutralization with an inorganic or organic acid.

12. The process of claim 10 wherein the double bond functionality of said binder is from about 0.8 to about 2.5.

13. The process of claim 10 wherein the ratio of components (a)-(d) are selected in order that at least 0.5 basic nitrogen atoms are present for each 1000 grams of binder solids.

14. The process of claim 10 wherein the ratio of components (a)–(d) are selected in order that more than 0.7 basic nitrogen atoms are present for each 1000 grams of binder solids.

15. The process of claim 10 wherein the alpha,beta-ethylenically unsaturated monoisocyanate is the reaction product of a polyisocyanate and an alpha,beta-ethylenically unsaturated monomer carrying at least one isocyanate reactive hydrogen atom and the group

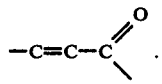

16. The process of claim 10 wherein (c) is an alpha,-beta-unsaturated monocarboxylic acid and the reaction between components (a) and (b) is carried out at from about 100° to 170° C. prior to the introduction of component (c), followed by introduction of (c) and reaction at from about 100° to 130° C.

17. The process of claim 10 wherein component (c) is a saturated monocarboxylic acid or an unsaturated monocarboxylic acid without alpha,beta-double bonds, and (a), (b), and (c) are simultaneously reacted at a temperature of from about 100° to 170° C.

18. The process of claim 10 wherein a plasticizing isocyanate is added.

19. The process of claim 18 wherein the plasticizing isocyanate is the reaction product of a polyisocyanate and a monoalcohol having at least six carbon atoms.

* * * * *